United States Patent [19]
FitzGerald

[11] Patent Number: 5,380,070
[45] Date of Patent: Jan. 10, 1995

[54] LUG NUT COVERS

[75] Inventor: David J. FitzGerald, San Leandro, Calif.

[73] Assignee: Wheel Masters, Inc., San Leandro, Calif.

[21] Appl. No.: 103,534

[22] Filed: Aug. 9, 1993

[51] Int. Cl.6 ............................................. B60B 7/14
[52] U.S. Cl. .............................. 301/37.37; 301/108.4; 411/429; 411/374
[58] Field of Search ................ 301/108.1, 108.4, 37.1, 301/37.37, 37.42, 35.62; 411/377, 429, 431, 372, 373, 374, 375, 376, 223, 235

[56] References Cited

U.S. PATENT DOCUMENTS

| | | | |
|---|---|---|---|
| 644,431 | 2/1900 | Karolewski | 411/235 |
| 1,049,138 | 12/1912 | Orbin | 411/235 |
| 1,254,514 | 1/1918 | Lehmann | 301/35.62 X |
| 4,659,273 | 4/1987 | Dudley | 411/429 |
| 4,968,202 | 11/1990 | Lanham | 411/431 |
| 5,193,884 | 3/1993 | Shell et al. | 301/108.4 X |
| 5,205,614 | 4/1993 | Wright | 301/37.37 |

FOREIGN PATENT DOCUMENTS 228786  2/1925  United Kingdom ............... 411/429

Primary Examiner—Russell D. Stormer
Attorney, Agent, or Firm—Linval B. Castle

[57] ABSTRACT

A vehicle wheel lug nut cover comprises a dome shaped tube having an open end that is larger than the lug nut and a closed end with an internal jam nut that is threaded to the end of the lug bolt extending from the lug nut. Lug nut covers may be used to secure a wheel cover to the wheel of the vehicle without removing a lug nut.

6 Claims, 1 Drawing Sheet

LUG NUT COVERS

BRIEF SUMMARY OF THE INVENTION

This invention relates to automotive wheels and more particularly to wheel lug nut covers which are functional as well as ornamental.

Virtually all modern automobiles and light trucks are supplied with ornamental wheel covers or hub caps that cover the entire wheel including the lug bolt and the lug nut that secures the wheel to the axle. However larger trucks and recreation vehicles are usually not so provided, trucks because the nature of their work would normally make an ornamental wheel cover useless, and recreation vehicles because RV owners usually prefer to add their own particular ornamental accessories, often a wheel cover that include lug nut covers.

When attaching wheel covers it is important that the lug nuts are not removed to secure the wheel cover. The lug bolts and nuts are made of steel that meets the manufacturers specifications and removal of the lug nuts to secure an ornamental wheel cover under the nuts may result in stresses on the wheel that could be dangerous and may invalidate the insurance on the entire vehicle. For that reason it is recommended that wheel covers be of the type that are attached to the wheel itself or to the lug nuts without loosening them.

Some RV or truck owners do not want ornamental wheel covers and prefer to plate or paint the wheels with a distinctive pattern or color, but choose to cover the wheel lug nuts to protect them from rust, dirt, or for appearance purposes.

The present invention if for a lug nut cover that is both ornamental and functional. It is dome shaped with flat sides for receiving a socket wrench and contains a non-rotatable, stationary jam nut which is threaded for attachment to threads at the end of the lug bolt that extends a short amount from the vehicle lug nut on many vehicles. When attached to a lug bolt, it is locked against the vehicle lug nut so that it cannot accidentally be lost and may be used only to cover a lug nut or may be used, along with the covers on the remaining lug nuts, to securely clamp an ornamental wheel cover to the wheel

BRIEF DESCRIPTION OF THE DRAWINGS

In the drawings which illustrates the preferred embodiment of the invention

DETAILED DESCRIPTION

Figure 1:
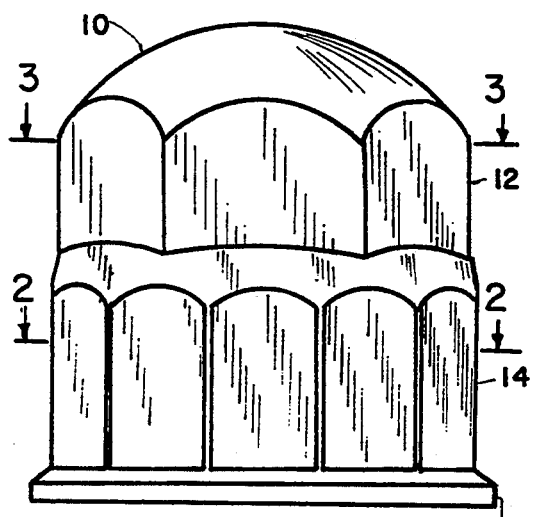
FIG. 1 is a elevational view of the lug nut cover.

The lug nut cover is shown in elevation in FIG. 1 and comprises a tubular shaped, round thin body 10 that is preferably metallic such as stainless steel. The top section 12 is closed; it may be domed and has a hexagonal exterior for engagement with a conventional hexagonal lug wrench and overlies the lug nut section 14 which is shown as a twelve sided polygon. The lug nut section 14 overlies the base or skirt 16 which is preferably circular and which has a larger diameter than the diameter of the lug nut for accommodating a washer under a lug nut or for locking against the surface of a wheel cover that has clearance holes for the lug nuts.

Figure 2:
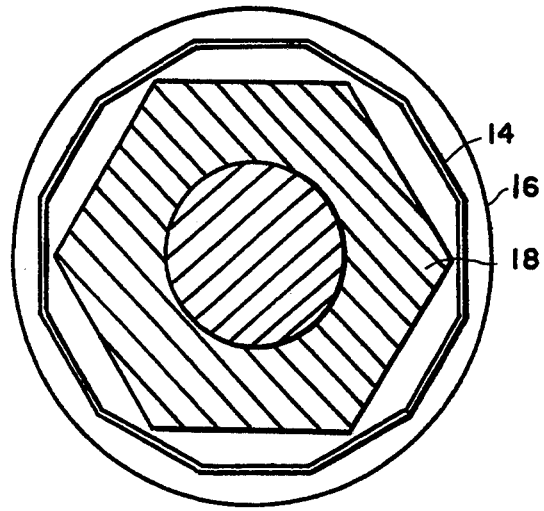
FIG. 2 is a plan view taken along the lines 2—2 of FIG. 1 and shows the position and clearance a vehicle lug nut in the cover.

FIG. 2 is a sectional plan view taken along the lines 2—2 of FIG. 1 and illustrates the lug nut cover 10 on a typical lug nut 18. The cover 10 must be free to rotate around a hexagonal lug nut 18, therefore the inside surface of the lug nut section 14 may be circular or any other configuration that will permit that relative rotation. The twelve sided polygon has the minimum number of flat sides that will not interfere with the rotation of the cover 10 around the hexagonal lug nut 18.

Figure 3:
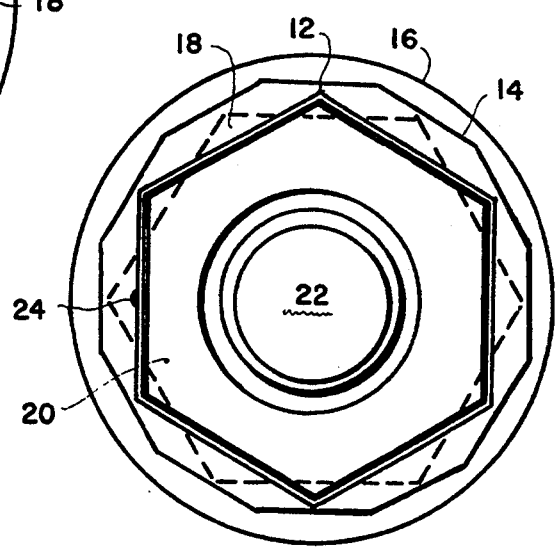
FIG. 3 is a plan view taken along the lines 3—3 of FIG. 1 and shows the stationary jam nut in the lug nut cover.

FIG. 3 is a sectional plan view taken along the lines 3—3 of FIG. 1 and illustrates the top section 12 of the cover 10, slightly turned from its position in FIG. 1 to illustrate a jam nut 20 locked in the top section engaging a lug nut 18 shown by dotted lines. The jam nut 20 is hexagonal and of a size that will tightly fit within the top section 12 which must be hexagonal and of a size that fits a conventional lug wrench, which is used for a tight installation. For convenience, the conventional lug wrench should be the same size that is used for the lug nuts 18.

The jam nut 20 may be formed of steel or a strong plastic material and is threaded to be screwed on to the lug bolt 22 that extends from the lug nut on many vehicles. The jam nut snugly fits within the cover and is securely attached to the cover by friction and by indenting or pinning 24 the cover to the jam nut.

Figure 4:
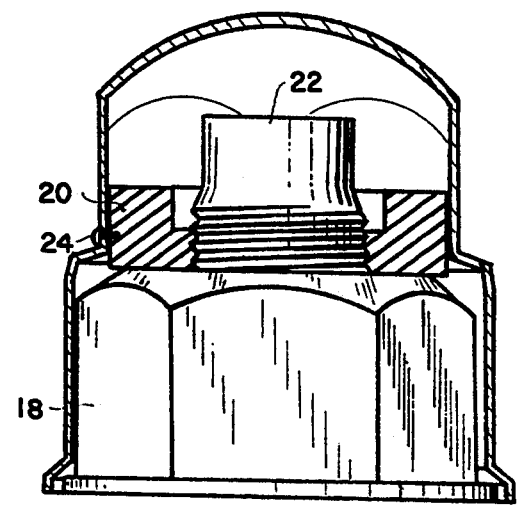
FIG. 4 is a sectional elevational view taken through the center of the lug nut cover.

FIG. 4 is a sectional elevational view of the lug nut cover 10 and illustrates a lug nut 18 mounted on a lug bolt 22 with the jam nut 20 in contact and tightened against the top surface of the lug nut. The threaded bore of the jam nut 20 need only engage about two threads of the lug bolt 22 but the exterior portion of the nut must be sufficiently thick to receive the pin 24 that secured it to the cover 10, It can be appreciated that the lug nut cover 10 with its jam nut 20 can be used to cover and protect lug nuts and exposed lug bolts and also has a wide skirt 16 that is valuable for securing the type of wheel cover that has holes for encircling the lug nuts.

I claim:

1. A lug nut cover for vehicles having wheel lug bolts with threads extending from the lug nut, said lug nut cover comprising:
    a tubular housing having first and second ends, said first end having an interior cross section dimension that permits rotation of a vehicle lug nut within said first end, said second end having an exterior cross section configuration substantially identical to that of said lug nut; and
    a threaded jam nut permanently secured by a pin in said second end and coaxially positioned to said lug nut for engagement with the threads that extend from said lug nut and for tight contact with said lug nut.

2. The lug nut cover claimed in claim 1 wherein said second end is enclosed.

3. The lug nut cover claimed in claim 2 wherein said closure is dome shaped.

4. The lug nut cover claimed in claim 2 wherein said first end of said nut cover terminates in a circular skirt having a diameter larger than the maximum diameter of said lug nut.

5. The lug nut cover claimed in claim 2 wherein said jam nut is formed of steel.

6. The lug nut cover claimed in claim 2 wherein said jam nut is formed of plastic.

* * * * *